United States Patent
Cho et al.

(10) Patent No.: US 11,067,791 B2
(45) Date of Patent: Jul. 20, 2021

(54) WEARABLE DEVICE FOR PROTECTING DISPLAY AND METHOD THEREOF

(71) Applicant: Samsung Electronics Co., Ltd., Suwon-si (KR)

(72) Inventors: Seongjin Cho, Suwon-si (KR); Naekyung Kim, Suwon-si (KR); Yongjoon Kim, Suwon-si (KR); Hanjun Kim, Suwon-si (KR); Jihyuk Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/367,010

(22) Filed: Mar. 27, 2019

(65) Prior Publication Data

US 2019/0302445 A1  Oct. 3, 2019

(30) Foreign Application Priority Data

Mar. 28, 2018 (KR) ................ 10-2018-0035724

(51) Int. Cl.
*G02B 26/02* (2006.01)
*G06F 3/14* (2006.01)

(52) U.S. Cl.
CPC ............. *G02B 26/02* (2013.01); *G06F 3/14* (2013.01)

(58) Field of Classification Search
CPC ....... G06F 3/14; G02B 27/0176; G02B 5/005; G02B 27/0172; G02B 7/002; G02B 26/02; G02B 2027/0118; G09G 2330/04; G09G 2360/144; G09G 3/003; G09G 2354/00
See application file for complete search history.

(56) References Cited

U.S. PATENT DOCUMENTS

| | | | |
|---|---|---|---|
| 5,255,117 A | 10/1993 | Cushman | |
| 2012/0249898 A1* | 10/2012 | Staley | F41G 1/383 349/13 |
| 2016/0091737 A1 | 3/2016 | Kim et al. | |
| 2016/0178904 A1* | 6/2016 | Deleeuw | G06F 3/011 345/8 |
| 2016/0328882 A1 | 11/2016 | Lee et al. | |
| 2017/0223249 A1 | 8/2017 | Tillotson et al. | |
| 2017/0255017 A1* | 9/2017 | Haseltine | G02B 27/0172 |
| 2018/0164588 A1* | 6/2018 | Leppanen | G06F 3/167 |
| 2019/0116301 A1* | 4/2019 | Pincenti | H04N 5/2351 |

FOREIGN PATENT DOCUMENTS

EP   1152283 B1   8/2005

OTHER PUBLICATIONS

International Search Report dated Jul. 5, 2019 in connection with International Patent Application No. PCT/KR2019/003549, 3 pages.
Written Opinion of the International Searching Authority dated Jul. 5, 2019 in connection with International Patent Application No. PCT/KR2019/003549, 5 pages.
Supplementary European Search Report dated Dec. 21, 2020 in connection with European Application No. 19774287.7, 9 pages.

\* cited by examiner

*Primary Examiner* — Charles V Hicks

(57) ABSTRACT

A wearable device includes at least one lens, an output device, at least one sensor, and at least one processor. The at least one processor is configured to identify a level of light sensed through the at least one sensor. The at least one processor is also configured to provide a notification related to the level of the light by using the output device when the level of the light satisfies a preset condition.

18 Claims, 16 Drawing Sheets

WEARABLE DEVICE FOR PROTECTING DISPLAY AND METHOD THEREOF

CROSS-REFERENCE TO RELATED APPLICATION

This application is based on and claims priority under 35 U.S.C. § 119 to Korean Patent Application No. 10-2018-0035724, filed on Mar. 28, 2018, in the Korean Intellectual Property Office, the disclosure of which is incorporated herein by reference in its entirety.

BACKGROUND

1. Field

Various embodiments relate to a wearable device that includes a display or is available by being coupled to a display, and an operation method of the wearable device.

2. Description of the Related Art

Some of electronic devices are provided in a form that is wearable on a body. These types of electronic devices may be called wearable devices. The electronic devices wearable on the body may include a head-mounted electronic device such as a head-mounted display (HMD).

An HMD may be worn on a user's body part (e.g., a user's head) to provide a virtual reality (VR) environment, an augmented reality (AR) environment, or a three-dimensional (3D) environment to the user.

For example, VR means a specific environment or situation that is created similar to reality by an artificial technology using a computer, etc., but is not real, or refers to the technology itself. The environment or situation created through VR may stimulate the five senses of a user, allowing the user to have spatial and temporal experiences that are similar to reality.

To provide a user with a VR or AR environment, an HMD-type wearable device provides a left-eye image and a right-eye image and generally includes a lens that transmits an image.

The HMD-type wearable device may include a lens implementable as a convex lens, thus focusing external light onto one point. Once the external light is focused onto one point on a display by the lens, the display included in the wearable device or a particular region of a display coupled to the wearable device may be damaged. A conventional wearable device or an electronic device (e.g., a smartphone) that may be coupled to the wearable device may not be capable of detecting a condition under which the display is damaged, failing to prevent a situation in which the display is damaged by the external light. Therefore, there is a need to develop a wearable device capable of preventing a situation in which a display of the wearable device or a display of an electronic device that may be coupled to the wearable device is damaged by the external light.

The above information is presented as background information only to assist with an understanding of the present disclosure. No determination has been made, and no assertion is made, as to whether any of the above might be applicable as prior art with regard to the present disclosure.

SUMMARY

Various embodiments of the present disclosure provide a wearable device and an operation method thereof in which external light is sensed, and a notification is output or the external light is physically blocked based on the level of the sensed external light, thereby preventing a situation in which a display is damaged.

According to various embodiments, a wearable device may include at least one lens, an output device, at least one sensor, at least one processor, and a memory, in which the memory has stored therein instructions, which cause, when executed by the at least one processor, the at least one processor to identify the level of light sensed through the at least one sensor and provide a notification related to the level of the light by using the output device when the identified level of the light satisfies a preset condition.

According to various embodiments, a wearable device may include at least one lens, a plurality of sectors that are arranged adjacent to the at least one lens to adjust the size of an exposure region of the at least one lens, a driving circuit configured to control the motion of each of the plurality of sectors, at least one sensor, and at least one processor, the at least one processor is further configured to identify the level of light sensed through the at least one sensor and to control the motion of the plurality of sectors to reduce the exposure region of the at least one lens through the driving circuit, when the identified level of the light satisfies a preset condition.

According to various embodiments, a control method of a wearable device may include sensing light, identifying the level of the sensed light, and outputting a notification when the identified level of the light satisfies a preset condition.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be disclosed with reference to the accompanying drawings.

A wearable device described herein may include all of a standalone-type wearable device that operates independently, a tethered-type wearable device that receives an image computed and processed in a personal computer (PC) and displays the image, and a drop-in type wearable device that uses a display of a mobile device by being coupled to the mobile device. The standalone-type wearable device and the tethered-type wearable device may include displays.

Figure 1A:
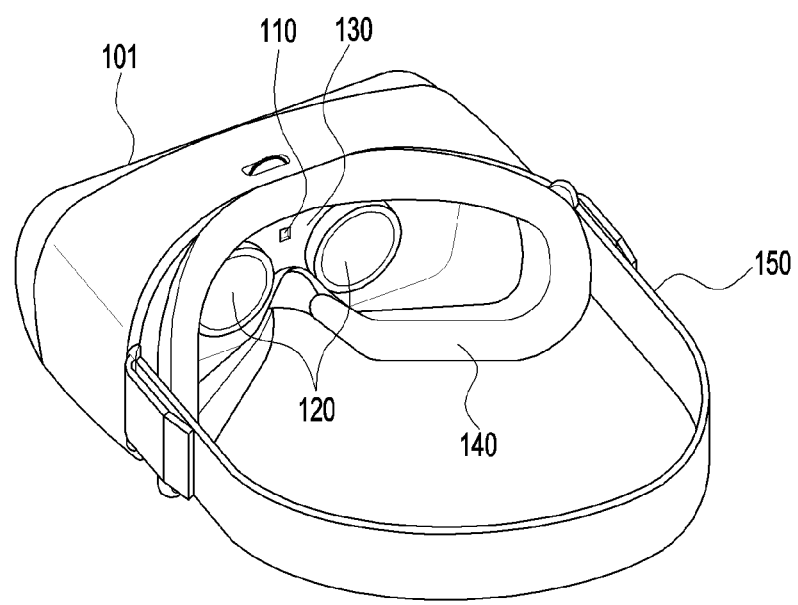
FIGS. 1A and 1B illustrate perspective views of a wearable device according to various embodiments of the present disclosure.
Figure 1B:
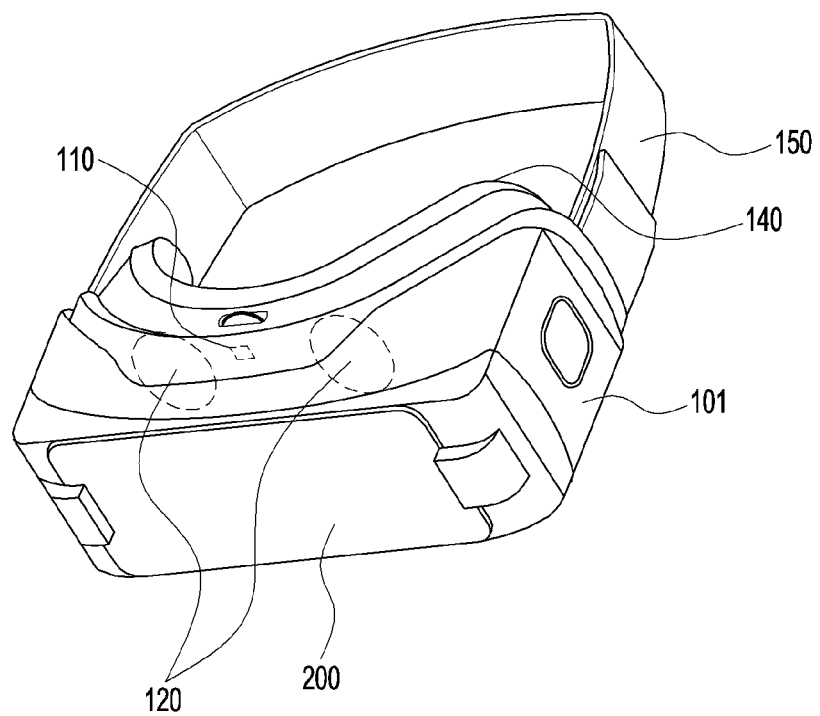

FIGS. 1A and 1B illustrate perspective views of wearable device according to various embodiments of the present disclosure. Referring to FIGS. 1A and 1B, a wearable device 101 according to various embodiments may be a head mounted display (HIVID) and may be worn on the head of a user. The wearable device 101 may include a display, and may be coupled to an external electronic device 200 including a display, as illustrated in FIG. 1B. As the user wears the wearable device 101, the user may view a left-eye image and a right-eye image that are displayed on the display of the wearable device 101 or the display of the external electronic device 200.

As illustrated in FIGS. 1A and 1B, the wearable device 101 according to various embodiments may include at least one sensor 110, at least one lens 120, a plate 130 close to both eyes of the user, a foam cushion 140 that closely contacts a user's face, and a user fixing device 150 provided to be mounted on the head of the user.

The sensor 110 may include at least one of an optical sensor for sensing light or a proximity sensor for determining whether the user wears the wearable device 101. The optical sensor and the proximity sensor may be provided separately or may be provided as one sensor (e.g., a proximity sensor). The sensor 110 may be arranged in an optimal position for sensing external light passing through the lens 120. For example, as illustrated in FIG. 1A, the sensor 110 may be arranged on the plate 130. The sensor 110 may identify a type of a light source that emits external light. For example, the sensor 110 may determine whether the external light is natural light (sunlight) or artificial light (a fluorescent lamp, a light-emitting diode (LED), etc.).

The lens 120 may include a left-eye lens or a right-eye lens. A left-eye image displayed on the display or a display of the external electronic device 200 may reach the user by passing through the left-eye lens, and a right-eye image displayed on the display or the display of the external electronic device 200 may reach the user by passing through the right-eye lens.

A first surface of the plate 130 may contact at least a part of the display of the external electronic device 200 or may be oriented toward the display of the wearable device 101. A second surface opposing the first surface of the plate 130 may be arranged toward the user's face. When the wearable device 101 includes the display, the second surface of the plate 130 may oppose the first surface oriented toward the display. When the wearable device 101 provides an image corresponding to a virtual reality (VR) application by being coupled to the external electronic device 200 including the display, the second surface of the plate 130 may oppose the first surface that closely contacts the external electronic device 200. The VR application may be an application capable of providing a display that is similar to reality to the user. In an embodiment, the VR application may display the left-eye image and the right-eye image respectively corresponding to both eyes of the user based on a stereoscopic scheme.

The user may bring their face (i.e., both eyes) into close contact with the foam cushion 140, thus observing an image corresponding to the VR application provided from the wearable device 101 or the external electronic device 200 combined with the wearable device 101 without interference from external light. For example, the user may observe the left-eye image and the right-eye image with both eyes through the lens 120.

The user fixing device 150 may be an element for allowing the wearable device 101 to be mounted on the user's head. The wearable device 101 may be worn on the user's head through the user fixing device 150 and thus may be fixed onto the user's head in spite of the user's movement.

Figure 2A:
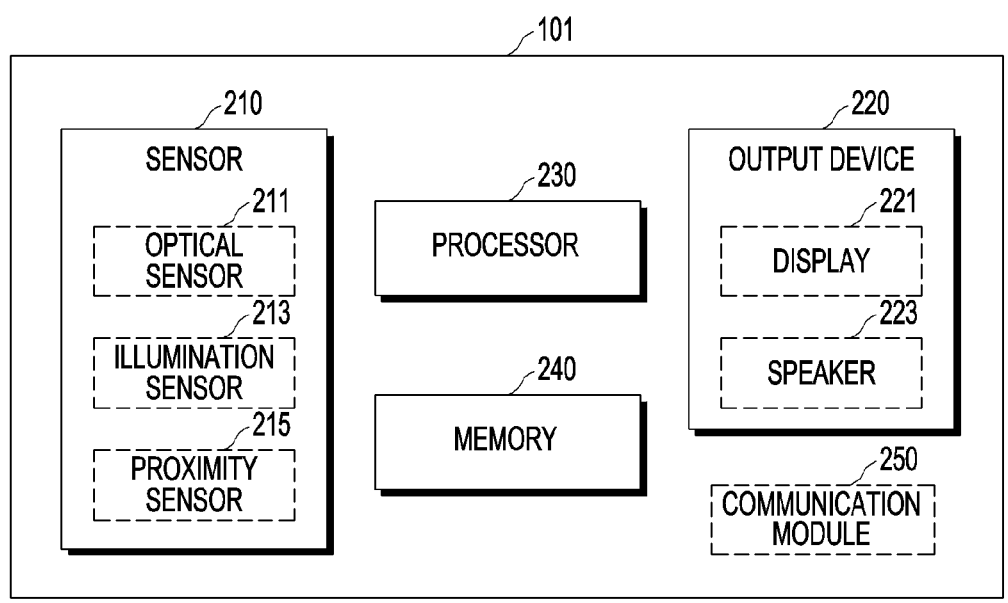
FIGS. 2A and 2B illustrate block diagrams of a wearable device according to various embodiments of the present disclosure.
Figure 2B:
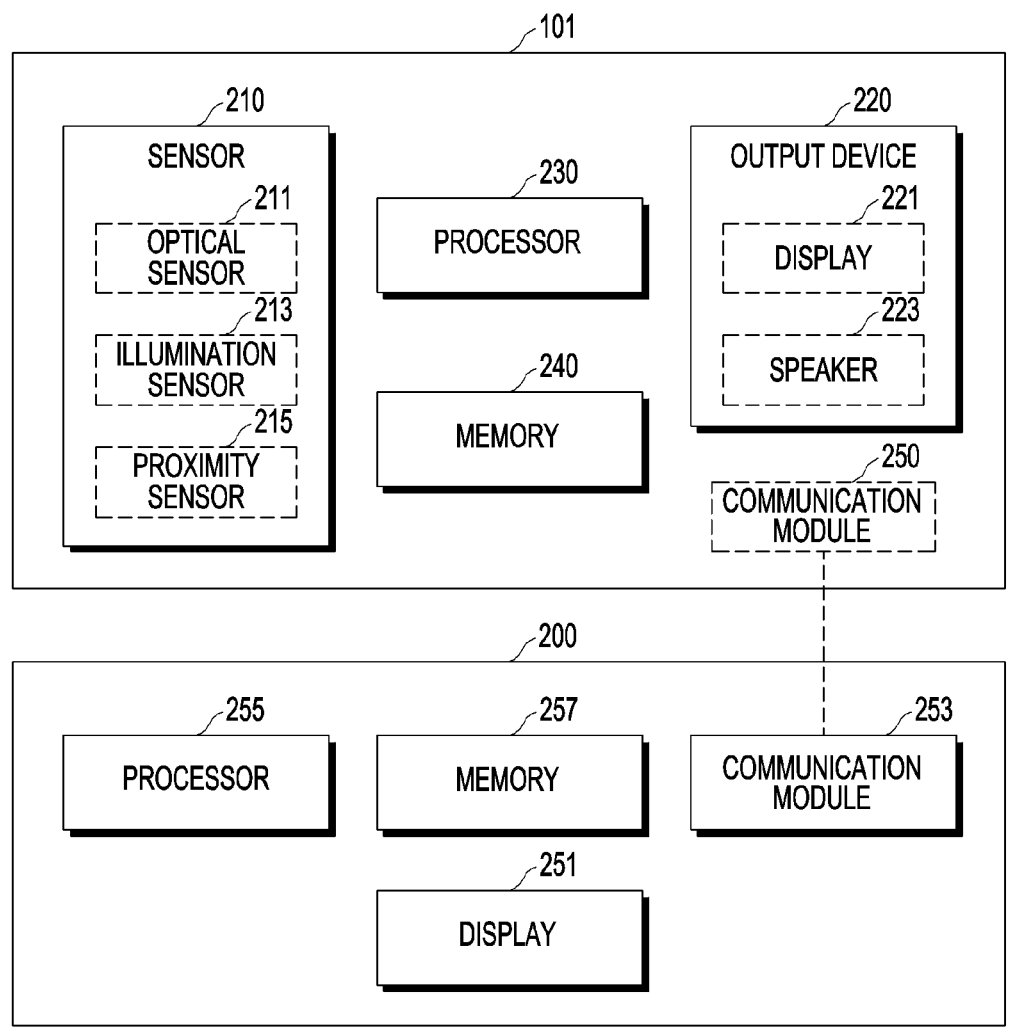

FIGS. 2A and 2B illustrate block diagrams of a wearable device according to various embodiments of the present disclosure.

As illustrated in FIG. 2A, the wearable device 101 may include at least one of a sensor 210, an output device 220, a processor 230, a memory 240, and a communication module 250.

The sensor 210 may generate an electrical signal or data value corresponding to an external environmental state of the wearable device 101. For example, the sensor 210 may include all or some of an optical sensor 211, an illumination sensor 213, and a proximity sensor 215 to sense light or a wearing state. Although it is illustrated in FIG. 2A that the wearable device 101 separately includes the optical sensor 211, the illumination sensor 213, and the proximity sensor 215, the wearable device 101 may include a sensor (e.g., a proximity sensor) coupled to a plurality of sensors.

The output device 220 may include all of a display 221 and a speaker 223 or a part thereof.

The display 221 may include an element for visually providing information to the user of the wearable device 101, e.g., a display panel and a control circuit for controlling the display panel. In various embodiments, when a preset condition is satisfied, the display 221 may display an alert image corresponding to a notification under control of the processor 230.

The speaker 223 may be a device for outputting an acoustic signal to the outside of the wearable device 101, for example, a speaker used for general purposes such as multimedia playback. In various embodiments, when the preset condition is satisfied, the speaker 223 may output an alert voice corresponding to a notification under control of the processor 230.

The processor 230 may drive, e.g., software to control at least one other component (e.g., a hardware or software component) of the wearable device 101 connected with the processor 230 and may process or compute various data. The processor 230 may load and process a command or data received from another component (e.g., the sensor 210 or the communication module 250) on a volatile memory, and the processor 230 may store resultant data in the memory 240 (e.g., a non-volatile memory).

According to various embodiments, the processor 230 may identify the level of light sensed through the sensor 210. For example, the level of the light may mean the intensity of the light. The processor 230 may determine whether the identified level of the light satisfies the preset condition. For example, the processor 230 may determine, as the preset condition, whether the identified level of the light exceeds a specific value. When the identified level of the light satisfies the preset condition, the processor 230 may display the alert image through the display 221, output the alert voice through the speaker 223, or transmit the alert message to the external electronic device through the communication module 250. When the identified level of the light satisfies the preset condition, the processor 230 may physically block the external light passing through the lens by using an element such as an iris, etc.

The processor 230 may identify a type of the light sensed through the sensor 210. For example, the processor 230 may identify whether the type of the sensed light is natural light. When the type of the sensed light is natural light, the processor 230 may display the alert image through the display 221, output the alert voice through the speaker 223, or transmit the alert message to the external electronic device through the communication module 250. When the type of the sensed light is natural light, the processor 230 may physically block the external light passing through the lens by using an element such as an iris, etc.

The communication module 250 may support establishing a wired or wireless communication channel between the wearable device 101 and the external electronic device and performing communication via the established communication channel. According to an embodiment, the communication module 250 may include a wireless communication module (e.g., a cellular communication module, a short-range wireless communication module, or a global navigation satellite system (GNSS) communication module) or a wired communication module 250 (e.g., a local area network (LAN) communication module), and may communicate with an external electronic device through a first network (e.g., a short-range communication network, such as Bluetooth, Wireless Fidelity (Wi-Fi) direct, or Infrared Data Association (IrDA)) or a second network (e.g., a long-range communication network, such as a cellular network, the Internet, or a communication network (e.g., LAN or wide area network (WAN)) by using a corresponding communication module. The above-enumerated types of communication modules 250 may be implemented in a single chip, when at least some of the modules are integrated, or individually in separate chips. In various embodiments, when a preset condition is satisfied, the communication module 250 may transmit an alert signal to an external electronic device under control of the processor 230.

FIG. 2B is a block diagram of the wearable device 101 according to various embodiments, in which the wearable device 101 may be combined with an external electronic device 200. More specifically, the wearable device 101 may be wirelessly/wiredly connected with the external electronic device 200. For example, the wearable device 101 may be connected with the external electronic device 200 by using a universal serial bus (USB), but this is merely an example, and those of ordinary skill in the art may easily understand that there is no limitation as long as the connection enables data transmission and reception between the two devices 101 and 200. In another example, the wearable device 101 may be simply physically connected with the external electronic device 200. As the user wears the wearable device 101 coupled to the external electronic device 200, the user may observe an image displayed on the display of the external electronic device 200.

According to various embodiments, when the wearable device 101 is a tethered-type wearable device, the wearable device 101 may include the display 221 to receive an image processed by the external electronic device 200 and to display the image. According to various embodiments, when the wearable device 101 is a drop-in-type wearable device, the wearable device 101 may not include the display 221 because of providing a VR image by using a display 251 of the external electronic device 200.

The same description as in FIG. 2A is applied to an element that is not separately described among elements included in the wearable device 101.

The external electronic device 200 may include the display 251, a communication module 253, a processor 255, and a memory 257.

The display 221 may include an element for visually providing information to the user of the external electronic device 200, e.g., a display panel and a control circuit for controlling the display panel. According to various embodiments, the display 251 may display an image corresponding to a VR application, once being coupled to the wearable device 101. The display 251 may display an image corresponding to a notification when the display 251 has the risk of being damaged by external light.

The communication module 253 may support establishing a wired or wireless communication channel between the external electronic device 200 and the wearable device 101 and performing communication via the established communication channel. According to various embodiments, the communication module 253 may receive a notification from the wearable device 101. For example, when the intensity of the external light exceeds a measurement value, the communication module 253 may receive a notification indicating that the display 251 may be damaged from the wearable device 101.

The processor 230 may drive, e.g., software to control at least one other component (e.g., a hardware or software component) of the external electronic device 200 connected with the processor 230 and may process or compute various data. The processor 255 may load and process a command or data received from another component (e.g., the communication module 253) on a volatile memory, and the processor 255 may store resultant data in the memory 257 (e.g., a non-volatile memory).

According to various embodiments, upon receiving an alert message through the communication module 253, the processor 230 may display an alert image corresponding to the alert message through the display 251. Displaying the alert image through the display 251 is an example, and vibration may be generated, an alert voice may be output, or any operation for reminding the user of a risk may be possible.

Figure 3A:
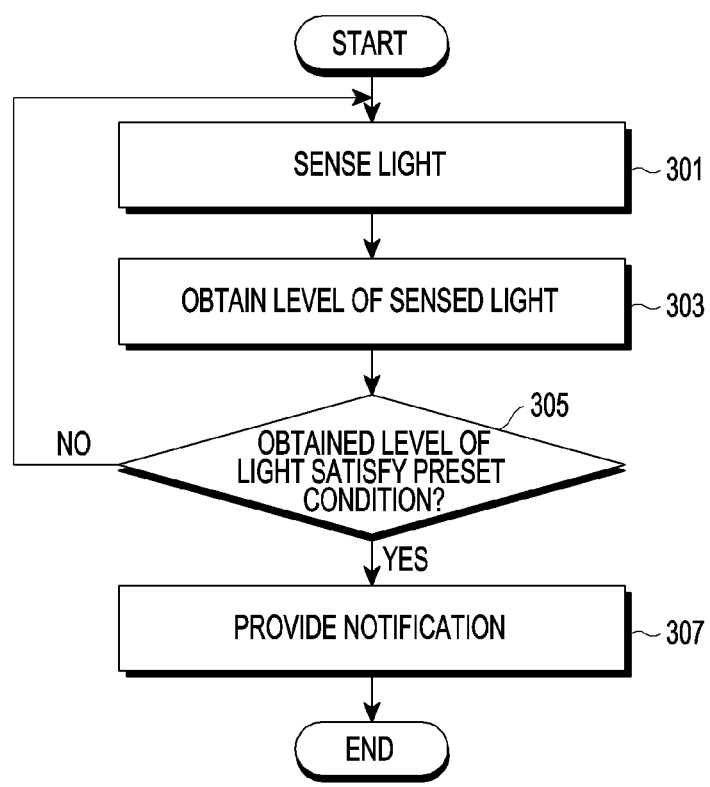
FIGS. 3A and 3B illustrate flowcharts describing an operation method of a wearable device according to various embodiments of the present disclosure.
Figure 3B:
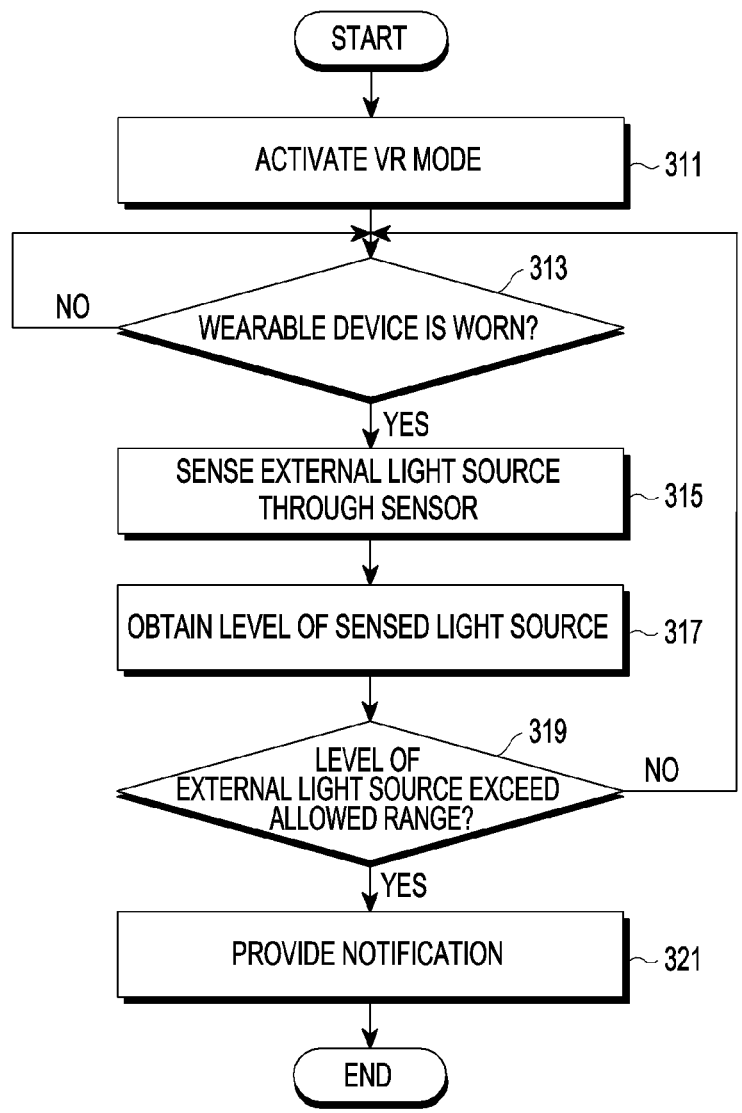
Figure 4A:
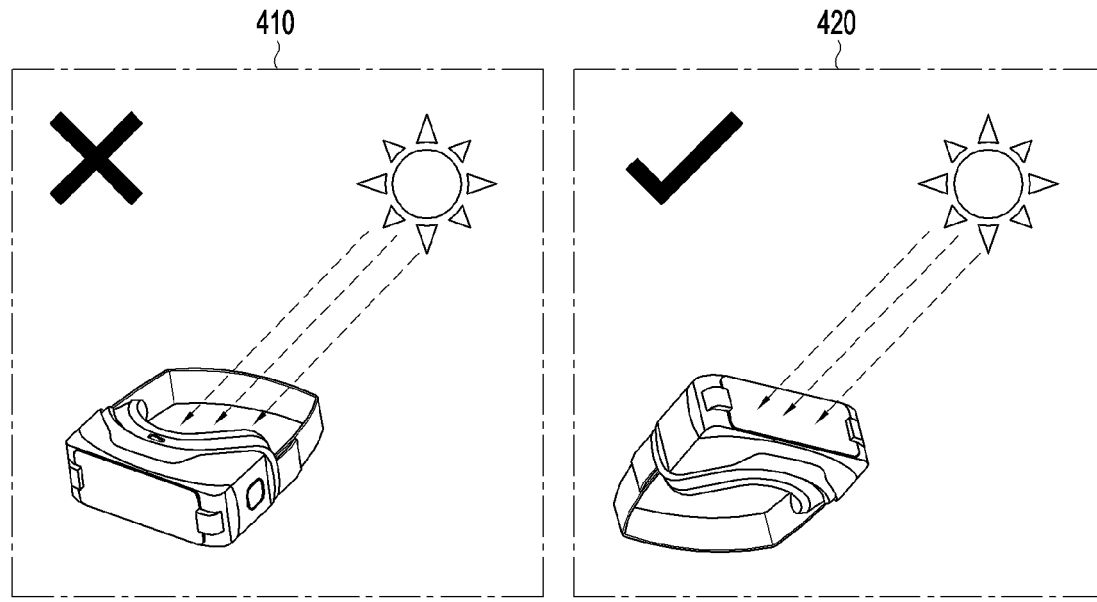
FIGS. 4A and 4B illustrate views describing output notification according to various embodiments of the present disclosure.
Figure 4B:
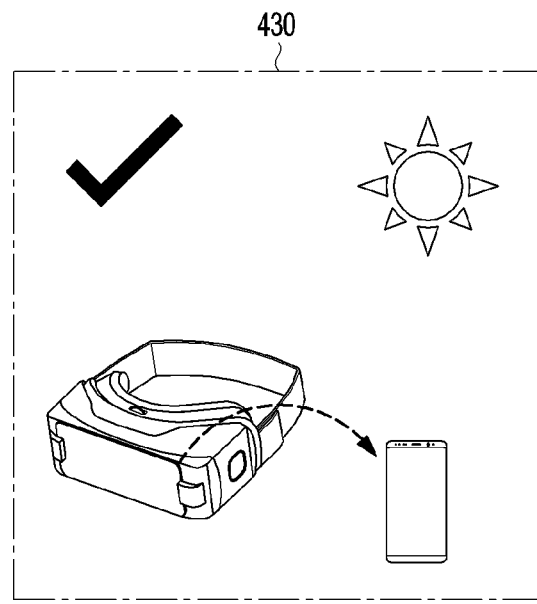

FIGS. 3A and 3B illustrate flowcharts describing an operation method of a wearable device according to various embodiments of the present disclosure. The embodiment illustrated in FIGS. 3A and 3B will be described in greater detail with reference to FIGS. 4A and 4B. FIGS. 4A and 4B illustrate views describing output notification according to various embodiments of the present disclosure.

According to various embodiments, the wearable device 101 (e.g., the processor 230) may sense light by using a sensor (e.g., the sensor 110) in operation 301. For example, the wearable device 101 may sense external light reaching a lens (or a plate).

In operation 303, the wearable device 101 may identify the level of the sensed light. For example, the level of the light may indicate the intensity of the light.

In operation 305, the wearable device 101 may determine whether the identified level of the light satisfies a preset condition. For example, the wearable device 101 may determine whether the identified intensity of the light exceeds a specific value. When the identified intensity of the light exceeds the specific value, the wearable device 101 may determine that the identified level of the light satisfies the preset condition. When the identified intensity of the light does not satisfy the preset condition, the wearable device 101 may go back to operation 301.

In operation 307, when the identified level of the light satisfies the preset condition (i.e., the intensity of the light exceeds the specific value), the wearable device 101 may provide a notification.

For example, when the identified level of the light satisfies the preset condition, the wearable device 101 may output an alert voice. The alert voice may be output as a maximum volume of a beep sound, etc., to allow the user to fully recognize a situation in which the display may be damaged.

In another example, when the identified level of the light satisfies the preset condition, the wearable device 101 may display an alert image. Referring to FIG. 4A, the wearable device 101 may display an alert image 410 together with an image 420 guiding a measure that may be taken. Referring to FIG. 4B, when the wearable device 101 does not include a display, an image 430 guiding separation of the external electronic device 200 from the wearable device 101 may be displayed through the external electronic device 200.

In another example, when the identified level of the light satisfies the preset condition, the wearable device 101 may transmit an alert signal to an external electronic device (e.g., the external electronic device 200 of FIG. 2B). The external electronic device having received the alert signal may display the alert image through the display, output the alert voice through the speaker, or generate vibration. The external electronic device may display an alert image 410 corresponding to an alert message or display an image 420 guiding a measure that may be taken, together, as illustrated in FIG. 4A. The alert image 410 may be an image representing a situation in which the display may be damaged by external light. For example, the alert image 410 may be an image illustrating a state in which the display is placed toward the external light. When the display is placed toward the external light, the external light reaches the display by passing through the lens that is implemented as a convex lens, such that the display may be damaged. The image 420 guiding the measure may be an image showing a state in which a surface opposing the display is placed toward an external light source such that the external light does not reach the display (or the display of the external electronic device when the wearable device 101 is coupled to the external electronic device). Meanwhile, the alert image 410 and the image 420 guiding the measure may be provided to the user in both a case in which the wearable device 101 includes the display and a case in which the wearable device 101 provides an image by being coupled to the external electronic device. When the wearable device 101 provides a VR image by being coupled to the external electronic device, without separately including the display, the wearable device 101 may display an image 430 guiding a measure as illustrated in FIG. 4B. For example, the image 430 guiding a measure may be an image indicating the separation between the wearable device 101 and the external electronic device.

Referring to FIG. 3B, according to various embodiments, the wearable device 101 (e.g., the processor 230) may activate a VR mode in operation 311. For example, the wearable device 101 may activate a VR mode when sensing that the external electronic device is coupled thereto through a proximity sensor or when being connected with the external electronic device 200 through an interface. The wearable device 101 may activate the VR mode in response to a separate user input.

In operation 313, the wearable device 101 may determine whether the wearable device 101 is worn by the user. For example, the wearable device 101 may determine whether the wearable device 101 is worn, by determining whether an object close to a particular region exists through the proximity sensor. When the wearable device 101 is not worn, the wearable device 101 may periodically or aperiodically determine whether the wearable device 101 is worn. Once the user wears the wearable device 101, both eyes of the user become close to the display and thus the display is not likely to be damaged by external light, reducing a need to sense the external light.

When the wearable device 101 is not worn, the wearable device 101 may sense the external light through the sensor in operation 315. When the wearable device 101 is not worn, the display is highly likely to be exposed to the external light, increasing the need to sense the external light.

In operation 317, the wearable device 101 may identify the level of the sensed light source. For example, the level of the light source may indicate the intensity of the light.

In operation 319, the wearable device 101 may determine whether the identified level of the light source satisfies a preset condition. For example, the wearable device 101 may determine whether the identified intensity of the light exceeds a specific value. When the identified intensity of the light exceeds the specific value, the wearable device 101 may determine that the identified level of the light satisfies the preset condition. When the identified intensity of the light does not satisfy the preset condition, the wearable device 101 may go back to operation 313.

In operation 321, when the identified level of the light satisfies the preset condition (e.g., the intensity of the light exceeds the specific value), the wearable device 101 may provide a notification.

For example, when the identified level of the light satisfies the preset condition, the wearable device 101 may output an alert voice. In another example, when the identified level of the light satisfies the preset condition, the wearable device 101 may display an alert image. Referring to FIG. 4A, the wearable device 101 may display an alert image 410 together with an image 420 guiding a measure that may be taken. Referring to FIG. 4B, when the wearable device 101 does not include a display, an image 430 guiding separation of the external electronic device from the wearable device 101 may be displayed through the external electronic device. In another example, when the identified level of the light satisfies the preset condition, the wearable device 101 may transmit an alert signal to an external electronic device (e.g., the external electronic device 200 of FIG. 2B). The external electronic device having received the alert signal may display the alert image (e.g., 410 or 420 of FIG. 4A or 430 of FIG. 4B) through the display, output the alert voice through the speaker, or generate vibration.

Figure 5A:
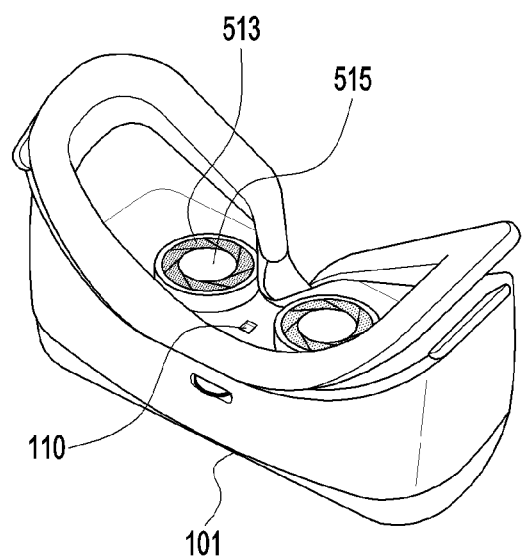
FIGS. 5A, 5B, 5C, and 5D illustrate views describing a method for adjusting an exposure region of a lens according to various embodiments of the present disclosure.
Figure 5B:
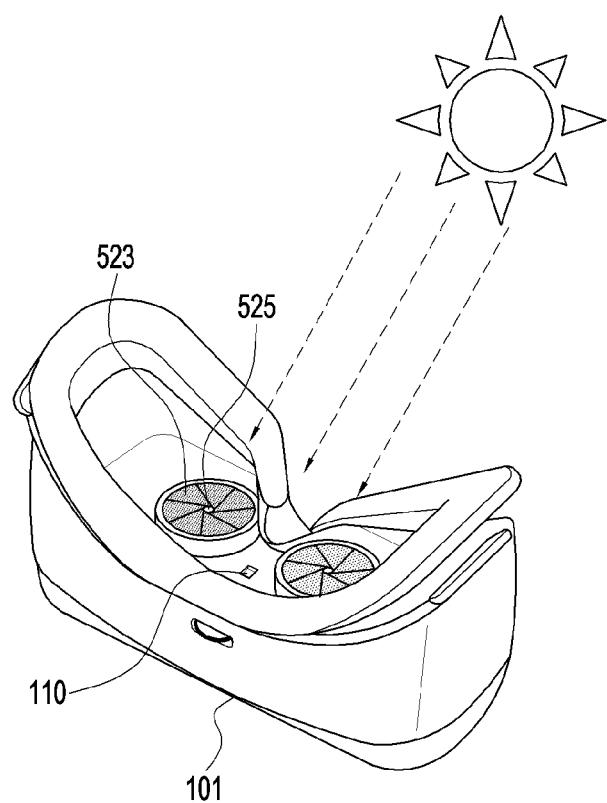
Figure 5C:
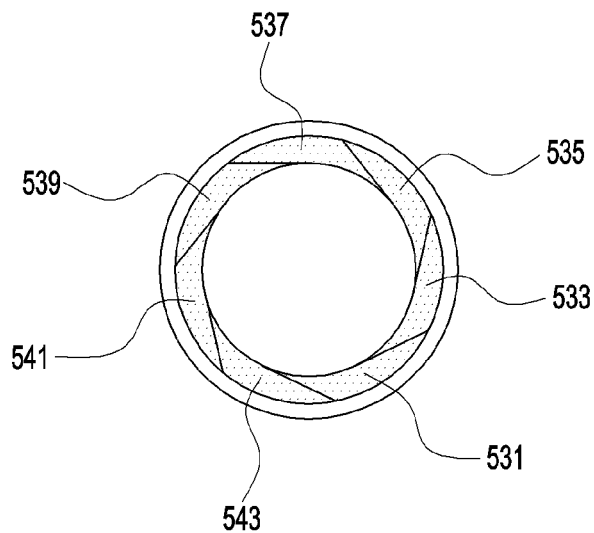
Figure 5D:
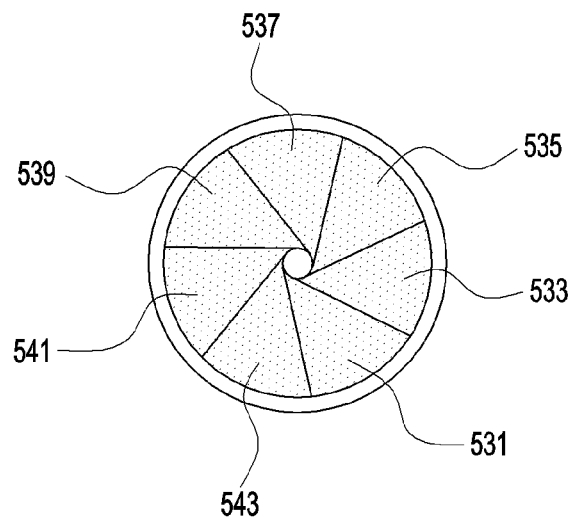

FIGS. 5A, 5B, 5C, and 5D illustrate views describing a method adjusting an exposure region of a lens according to various embodiments of the present disclosure. Referring to FIG. 5A, the wearable device 101 may reduce an exposure region 515 when the intensity of light identified through the sensor 110 exceeds a particular value in a state in which a plurality of sectors 513 are opened and thus the exposure region 515 of the lens is largest. For example, as illustrated in FIG. 5B, as a plurality of sectors 523 are closed and thus an exposure region 525 of the lens is minimized, external light passing through the lens may be physically blocked. As to a method for adjusting the exposure region of the lens, as illustrated in FIG. 5C, the wearable device 101 may open a plurality of sectors 531, 533, 535, 537, 539, 541, and 543 (e.g., an iris), thus maximizing the exposure region of the lens. By maximizing the exposure region of the lens, the user may not experience inconvenience in observing a VR image even when the wearable device 101 includes the plurality of sectors. As illustrated in FIG. 5D, the wearable device 101 may close the plurality of sectors 531, 533, 535, 537, 539, 541, and 543 (e.g., the iris), thus minimizing the exposure region of the lens. By minimizing the exposure region of the lens, the external light may be physically prevented from passing through the lens and thus reaching the display device.

Figure 6A:
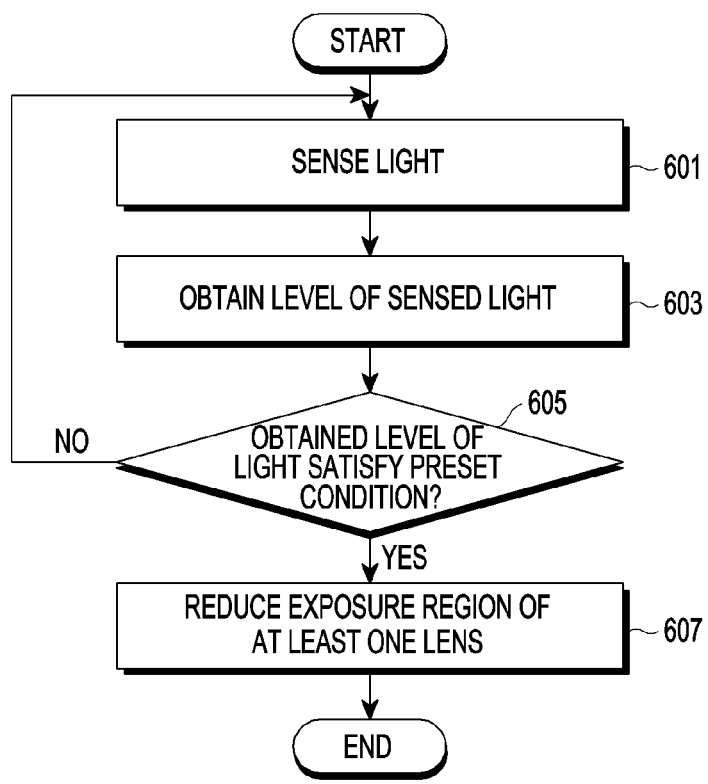
FIGS. 6A and 6B illustrate flowcharts describing an operation method of a wearable device according to various embodiments of the present disclosure.
Figure 6B:
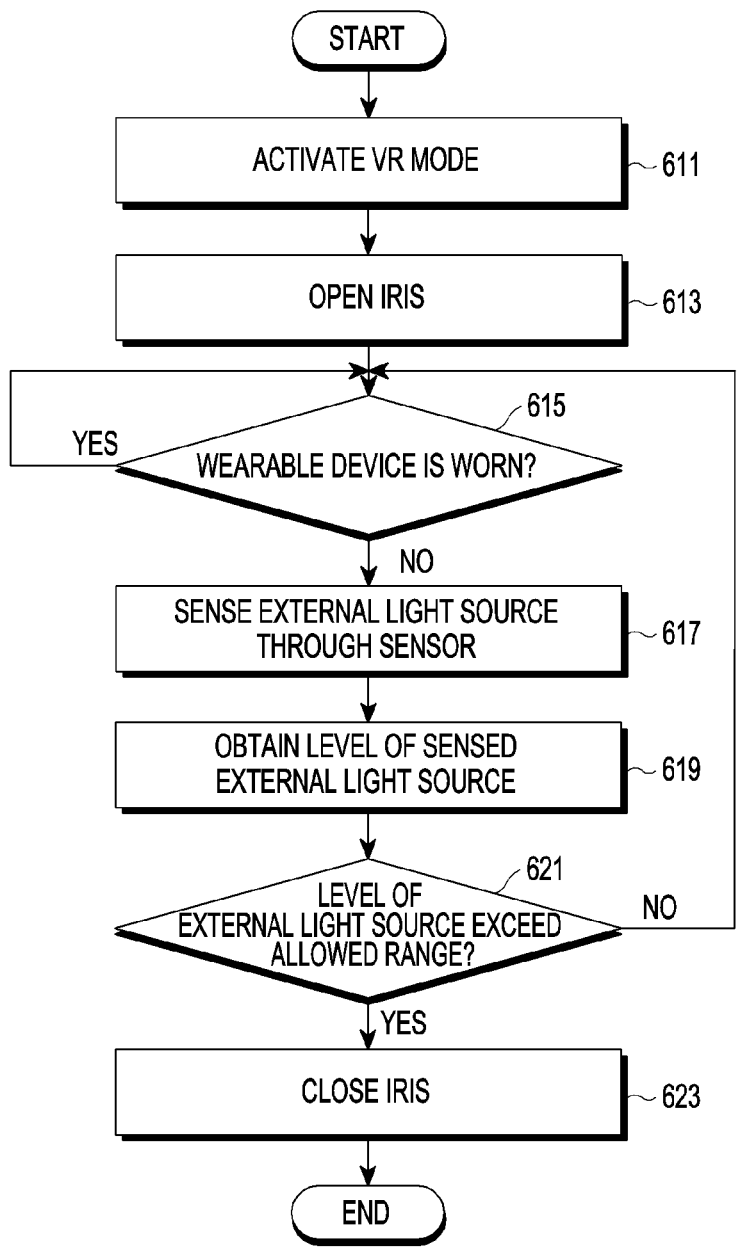

FIGS. 6A and 6B illustrate flowcharts describing an operation method of a wearable device according to various embodiments of the present disclosure.

According to various embodiments, the wearable device 101 (e.g., the processor 230) may sense light by using a sensor in operation 601. For example, the wearable device 101 may sense external light reaching a lens or a plate.

In operation 603, the wearable device 101 may identify the level of the sensed light. For example, the level of the light may indicate the intensity of the light.

In operation 605, the wearable device 101 may determine whether the identified level of the light satisfies a preset condition. For example, the wearable device 101 may determine whether the identified intensity of the light exceeds a specific value. When the identified intensity of the light exceeds the specific value, the wearable device 101 may determine that the identified level of the light satisfies the preset condition. When the identified intensity of the light does not satisfy the preset condition, the wearable device 101 may go back to operation 601.

In operation 607, when the identified level of the light satisfies the preset condition (i.e., the intensity of the light exceeds the specific value), the wearable device 101 may reduce an exposure region of at least one lens. For example, the wearable device 101 may reduce the exposure region of the lens by closing a plurality of sectors (e.g., 523 of FIG. 5B).

Referring to FIG. 6B, according to various embodiments, the wearable device 101 (e.g., the processor 230) may activate a VR mode in operation 611. For example, the wearable device 101 may activate a VR mode when sensing that the external electronic device is coupled thereto through a proximity sensor or when being connected with the external electronic device 200 through an interface. The wearable device 101 may activate the VR mode in response to a separate user input.

In operation 613, the wearable device 101 may open the iris (e.g., the plurality of sectors 531, 533, 535, 537, 539, 541, and 543). The iris may be arranged between the user's both eyes and the lens, and the user may observe an image corresponding to a VR application by opening the iris.

In operation 615, the wearable device 101 may determine whether the wearable device 101 is worn by the user. For example, the wearable device 101 may determine whether the wearable device 101 is worn, by determining whether an object close to a particular region exists through the proximity sensor. When the wearable device 101 is not worn, the wearable device 101 may periodically or aperiodically determine whether the wearable device 101 is worn. Once the user wears the wearable device 101, both eyes of the user become close to the display and thus the display is not likely to be damaged by external light, reducing a need to sense the external light.

When the wearable device 101 is not worn in operation 617, the wearable device 101 may sense the external light through the sensor. When the wearable device 101 is not worn, the display is highly likely to be exposed to the external light, increasing the need to sense the external light.

In operation 619, the wearable device 101 may identify the level of the sensed light source. For example, the level of the light source may indicate the intensity of the light.

In operation 621, the wearable device 101 may determine whether the identified level of the light source satisfies a preset condition. For example, the wearable device 101 may determine whether the identified intensity of the light exceeds a specific value. When the identified intensity of the light exceeds the specific value, the wearable device 101 may determine that the identified level of the light satisfies the preset condition. When the identified intensity of the light does not satisfy the preset condition, the wearable device 101 may go back to operation 615.

In operation 623, when the identified level of the light satisfies the preset condition (e.g., the intensity of the light exceeds the specific value), the wearable device 101 may close the opened iris. When the iris is closed, light passing through the lens is physically blocked, thus preventing the display from being damaged by the light passing through the lens.

Figure 7A:
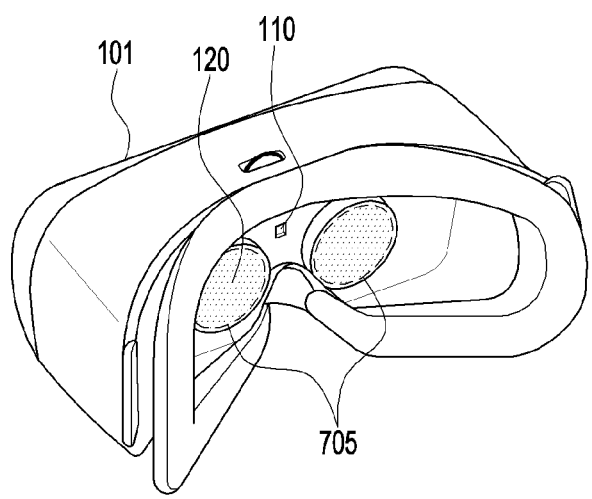
FIGS. 7A and 7B illustrate views describing a method for blocking light according to various embodiments of the present disclosure.
Figure 7B:
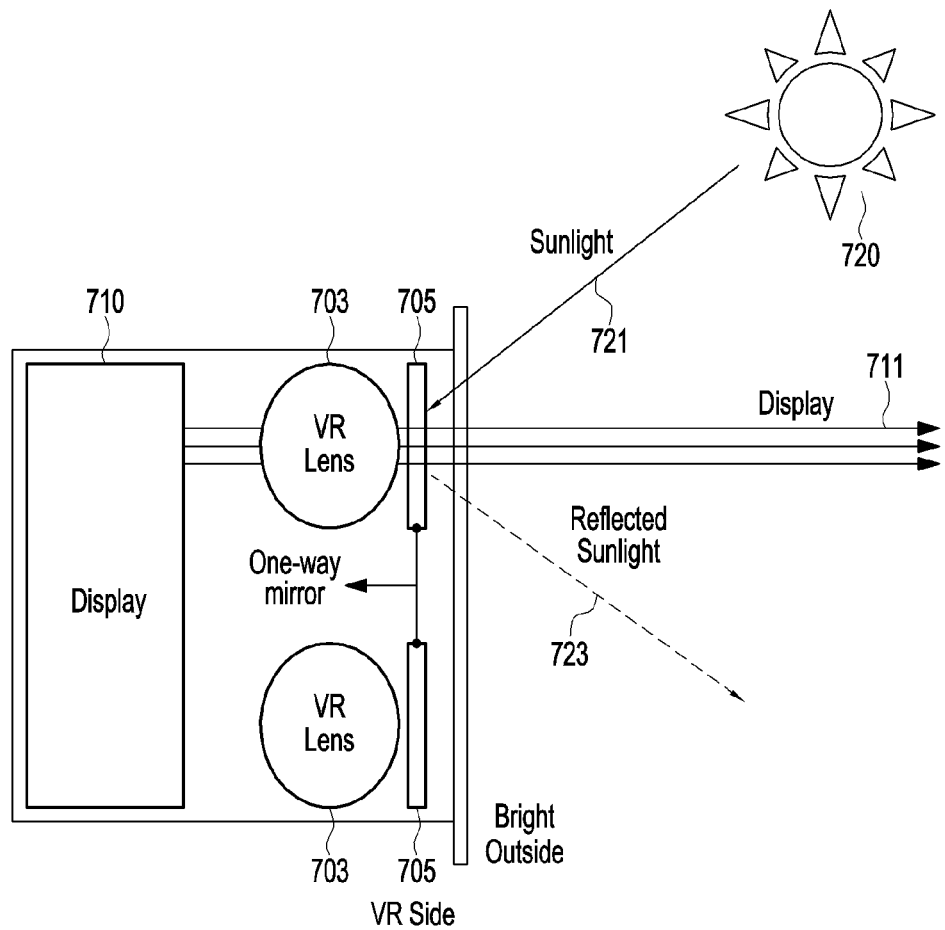

FIGS. 7A and 7B illustrate views describing a method for blocking light according to various embodiments of the present disclosure. As illustrated in FIG. 7A, the wearable device 101 may include an element covering the lens 120. For example, the wearable device 101 may include a one-way mirror 705 covering the lens 120. The one-way mirror 705 is a mirror having the principle of reflecting light at a bright side.

As illustrated in FIG. 7B, the one-way mirror 705 may be arranged close to a surface contacting the user's both eyes out of both faces of a VR lens 703 (e.g., the lens 120 of FIG. 1A). Thus, light from a display 710 (e.g., the display 221 of FIG. 2A) is delivered to the eye of the user after passing through the one-way mirror 705, and external light (e.g., sunlight) 721 is reflected as reflected light 723 (e.g., reflected sunline), failing to pass through the one-way mirror 705, such that the external light 721 may not pass through a VR lens 703 and thus not damage the display 710. Light 711 corresponding to an image provided through the display 710 passes through the one-way mirror 705, and thus the user may not experience any inconvenience in observing a VR image even when the one-way mirror 705 is placed in front of the VR lens 703. Although it is described with reference to FIGS. 7A and 7B that the one-way mirror 705 is arranged close to one surface of the VR lens 703, an element capable of blocking external light without blurring a displayed image may be arranged. For example, by attaching a light source protection film, the external light may be physically blocked.

Figure 8A:
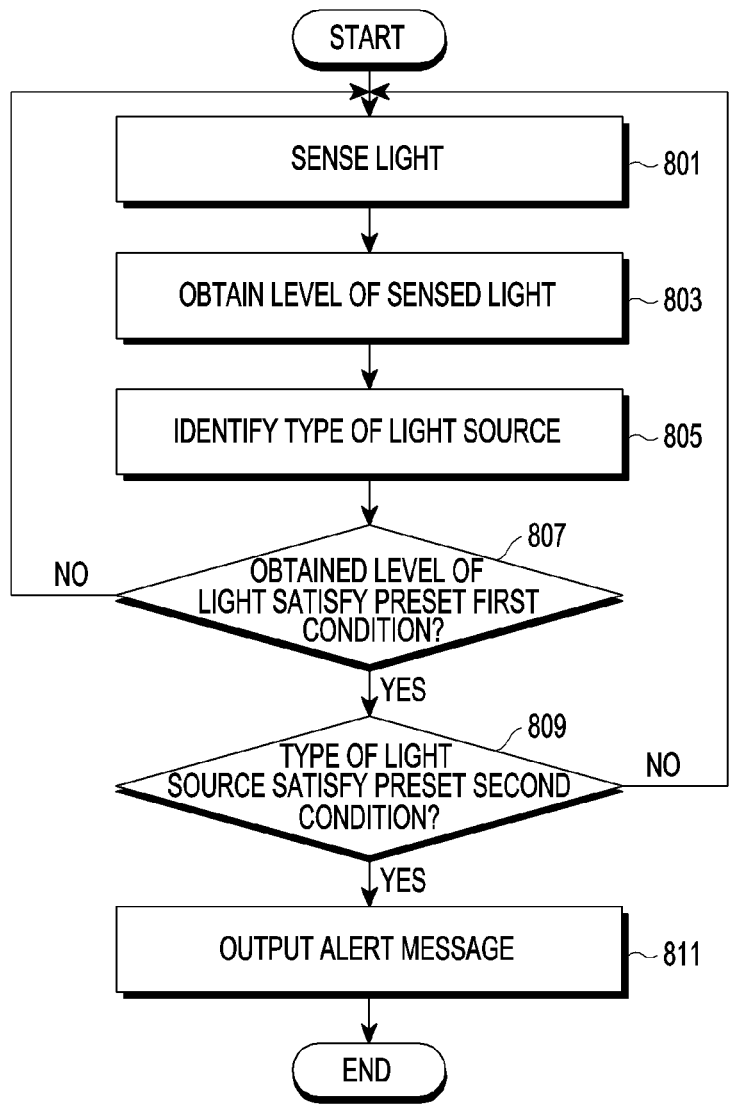
FIGS. 8A and 8B illustrate flowcharts describing an operation method of a wearable device according to various embodiments of the present disclosure.
Figure 8B:
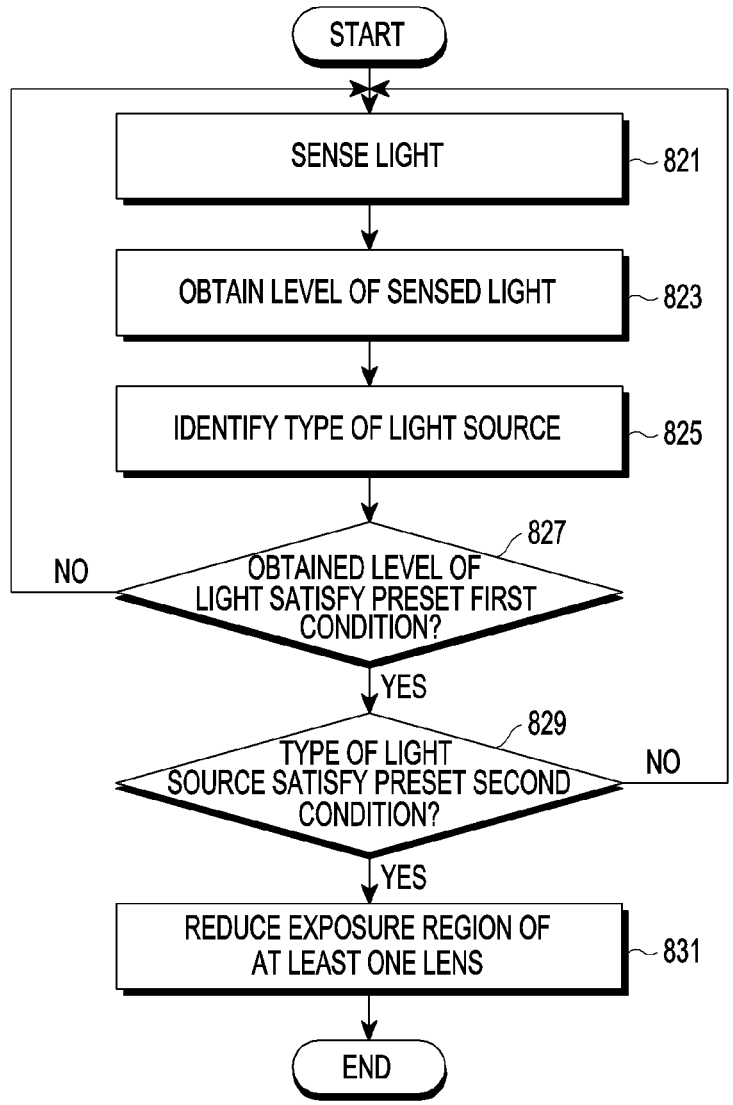

FIGS. 8A and 8B illustrate flowcharts describing an operation method of a wearable device according to various embodiments of the present disclosure.

According to various embodiments, the wearable device 101 (e.g., the processor 230) may sense light by using a sensor in operation 801. For example, the wearable device 101 may sense external light reaching a lens or a plate.

In operation 803, the wearable device 101 may identify the level of the sensed light. For example, the level of the light may indicate the intensity of the light.

In operation 805, the wearable device 101 may identify the type of light source. For example, the wearable device 101 may determine whether a light source emitting the sensed light is natural light (sunlight) or artificial light (a fluorescent lamp, a light-emitting diode (LED), etc.). When the type of light source is natural light, the external light may reach the display by passing through the lens and thus damage the display, such that efficiency may be improved by identifying the type of light source.

In operation 807, the wearable device 101 may determine whether the identified level of the light satisfies a first condition. For example, the wearable device 101 may determine whether the identified intensity of the light exceeds a specific value. When the identified intensity of the light exceeds the specific value, the wearable device 101 may determine that the identified level of the light satisfies the first condition. When the identified intensity of the light does not satisfy the first condition, the wearable device 101 may go back to operation 801.

In operation 809, the wearable device 101 may determine whether the identified level of the light satisfies a second condition. For example, the wearable device 101 may determine whether the type of light source emitting the sensed light is natural light. When the identified type of light source is natural light, the wearable device 101 may determine that the type of light source satisfies the second condition. When the type of light source does not satisfy the second condition, the wearable device 101 may go back to operation 801.

In operation 811, when the identified level of the light satisfies the second condition (e.g., the type of light source is natural light), the wearable device 101 may provide a notification. For example, when the identified level of the light satisfies the second condition, the wearable device 101 may output an alert voice. The alert voice may be output as a maximum volume of a beep sound, etc., to allow the user to fully recognize a situation in which the display may be damaged. In another example, when the identified level of the light satisfies the second condition, the wearable device 101 may display an alert image. In another example, when the identified level of the light satisfies the second condition, the wearable device 101 may transmit an alert signal to an external electronic device (e.g., the external electronic device 200 of FIG. 2B). The external electronic device having received the alert signal may display the alert image through the display, output the alert voice through the speaker, or generate vibration.

According to various embodiments, the wearable device 101 (e.g., the processor 230) may sense light by using a sensor in operation 821. For example, the wearable device 101 may sense external light reaching a lens or a plate.

In operation 823, the wearable device 101 may identify the level of the sensed light. For example, the level of the light may indicate the intensity of the light.

In operation 825, the wearable device 101 may identify the type of light source. For example, the wearable device 101 may determine whether a light source emitting the sensed light is natural light (sunlight) or artificial light (a fluorescent lamp, a light-emitting diode (LED), etc.). When the type of light source is natural light, the external light may reach the display by passing through the lens and thus damage the display, such that efficiency may be improved by identifying the type of light source.

In operation 827, the wearable device 101 may determine whether the identified level of the light satisfies a first condition. For example, the wearable device 101 may determine whether the identified intensity of the light exceeds a specific value. When the identified intensity of the light exceeds the specific value, the wearable device 101 may determine that the identified level of the light satisfies the first condition. When the identified intensity of the light does not satisfy the first condition, the wearable device 101 may go back to operation 801.

In operation 829, the wearable device 101 may determine whether the identified level of the light satisfies a second condition. For example, the wearable device 101 may determine whether the type of light source emitting the sensed light is natural light. When the identified type of light source is natural light, the wearable device 101 may determine that the type of light source satisfies the second condition. When the type of light source does not satisfy the second condition, the wearable device 101 may go back to operation 801.

In operation 831, when the identified level of the light satisfies the second condition (e.g., the type of light source is natural light), the wearable device 101 may reduce an exposure region of the lens. For example, the wearable device 101 may reduce the size of an exposure region of the lens by controlling the motion of the plurality of sectors (e.g., 513 of FIG. 5A) that adjust the size of the exposure region of the lens.

According to various embodiments, a wearable device (e.g., the wearable device 101) may include at least one lens (e.g., the lens 120), an output device (e.g., the output device 220), at least one sensor (e.g., the sensor 210), and at least one processor (e.g., the processor 230), in which the at least one processor (e.g., the processor 230) may be configured to identify the level of light sensed through the at least one sensor (e.g., the sensor 210) and to provide a notification related to the level of the light by using the output device (e.g., the output device 220) when the identified level of the light satisfies a preset condition.

According to various embodiments, the at least one processor (e.g., the processor 230) may be further configured to identify the type of light source that emits the light and to provide the notification by using the output device (e.g., the output device 220) when the type of light source satisfies another preset condition.

According to various embodiments, the output device (e.g., the output device 220) may include a display (e.g., the display 221) and a plate (e.g., the plate 130) that is directed toward the display (e.g., the display 221) and includes a first surface and a second surface opposing the first surface, the plate (e.g., the plate 130) may include an opening in at least a partial region thereof and the at least one lens (e.g., the lens 120) is arranged aligned with the opening, and the at least one sensor (e.g., the sensor 210) is arranged on the second surface of the plate (e.g., the plate 130).

According to various embodiments, the at least one processor (e.g., the processor 230) may be further configured to determine whether the wearable device (e.g., the wearable device 101) is worn, by using the at least one sensor (e.g., the sensor 210) and to identify the level of the light sensed through the at least one sensor (e.g., the sensor 210) when determining that the wearable device (e.g., the wearable device 101) is not worn.

According to various embodiments, the wearable device (e.g., the wearable device 101) may further include a communication module (e.g., the communication module 250), in which the at least one processor (e.g., the processor 230) may be further configured to transmit the notification to an external electronic device (e.g., the external electronic device 200) through the communication module (e.g., the communication module 250), when the identified level of the light satisfies the preset condition.

According to various embodiments, the output device (e.g., the output device 220) may include a speaker (e.g., the speaker 223), and the at least one processor (e.g., the processor 230) may be further configured to output audio corresponding to the notification through the speaker (e.g., the speaker 223), when the identified level of the light satisfies the preset condition.

According to various embodiments, the output device (e.g., the output device 220) may include a display (e.g., the display 221), and the at least one processor (e.g., the processor 230) may be further configured to output an image corresponding to the notification through the display (e.g., the display 221), when the identified level of the light satisfies the preset condition.

According to various embodiments, a wearable device (e.g., the wearable device 101) may include at least one lens (e.g., the lens 120), a plurality of sectors (e.g., the sector 513) that are arranged adjacent to the at least one lens to adjust the size of an exposure region of the at least one lens (e.g., the lens 120), a driving circuit configured to control the motion of each of the plurality of sectors (e.g., the sector 513), at least one sensor (e.g., the sensor 210), and at least one processor (e.g., the processor 230), in which the at least one processor (e.g., the processor 230) is further configured to identify the level of light sensed through the at least one sensor (e.g., the sensor 210) and to control the motion of the plurality of sectors (e.g., the sector 513) to reduce the exposure region of the at least one lens (e.g., the lens 120) through the driving circuit, when the identified level of the light satisfies a preset condition.

According to various embodiments, the at least one processor (e.g., the processor 230) may be further configured to identify the type of light source that emits the light and to control the motion of the plurality of sectors (e.g., the sector 513) to reduce the exposure region of the at least one lens (e.g., the lens 120) through the driving circuit, when the type of light source satisfies another preset condition.

According to various embodiments, the wearable device (e.g., the wearable device 101) may further include a display (e.g., the display 221) and a plate (e.g., the plate 130) that is directed toward the display (e.g., the display 221) and includes a first surface and a second surface opposing the first surface, in which the plate (e.g., the plate 130) includes an opening in at least a partial region thereof and the at least one lens (e.g., the lens 120) is arranged aligned with the opening, and the at least one sensor (e.g., the sensor 210) is arranged on the second surface of the plate.

According to various embodiments, the at least one processor (e.g., the processor 230) may be further configured to determine whether the wearable device (e.g., the wearable device 101) is worn, by using the at least one sensor (e.g., the sensor 210) and to identify the level of the light sensed through the at least one sensor (e.g., the sensor 210) when determining that the wearable device (e.g., the wearable device 101) is not worn.

According to various embodiments, the at least one processor (e.g., the processor 230) may be further configured to control the motion of the plurality of sectors (e.g., the sector 513) to reduce the exposure region of the at least one lens (e.g., the lens 120) through the driving circuit, when determining that the wearable device (e.g., the wearable device 101) is worn.

According to various embodiments, the wearable device (e.g., the wearable device 101) may further include an output device, in which the at least one processor (e.g., the processor 230) is further configured to provide a notification related to the level of the light through the output device (e.g., the output device 220) when the identified level of the light satisfies a preset condition.

According to various embodiments, the at least one processor (e.g., the processor 230) may be further configured to control the motion of the plurality of sectors (e.g., the sector 513) to reduce the exposure region of the at least one lens (e.g., the lens 120) through the driving circuit, when receiving a display protection mode entry command for protecting the display (e.g., the display 221).

According to various embodiments, a control method of a wearable device (e.g., the wearable device 101) may include sensing light, determining the level of the sensed light, and providing a notification related to the level of the light when the level of the light satisfies a preset condition.

According to various embodiments, the control method may further include identifying the type of light source that emits the light and providing the notification when the type of light source satisfies another preset condition.

According to various embodiments, the control method may further include determining whether a wearable device (e.g., the wearable device 101) is worn and sensing the light when determining that the wearable device (e.g., the wearable device 101) is not worn.

According to various embodiments, the providing of the notification may include transmitting the notification to an external electronic device (e.g., the external electronic device 200) when the level of the light satisfies the preset condition.

According to various embodiments, the providing of the notification may include outputting audio corresponding to the notification when the level of the light satisfies the preset condition.

According to various embodiments, the providing of the notification may include outputting an image corresponding to the notification when the level of the light satisfies the preset condition.

According to various embodiments, the wearable device may sense external light.

According to various embodiments, the wearable device and the operation method thereof may be provided in which when the level of the sensed external light exceeds a specific value, a notification is output to prevent a display from being damaged by the external light.

According to various embodiments, the wearable device and the operation method thereof may be provided in which when the level of the sensed external light exceeds a specific value, the external light is physically blocked to prevent a display from being damaged by the external light.

The wearable device according to various embodiments may be one of various types of devices. The wearable device may be, particularly, an HMD. The electronic device according to various embodiments may be one of various types of devices. The electronic devices may include, for example, a portable communication device (e.g., a smart phone), a computer device, a portable multimedia device, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1$^{st}$" and "2$^{nd}$," or "first" and "second" may be used to simply distinguish a corresponding component from another, and does not limit the components in other aspect (e.g., importance or order). When it is described that an element (such as a first element) is "operatively or communicatively coupled with/to" or "connected" to another element (such as a second element), the element can be directly connected to the other element or can be connected to the other element through another element (e.g., a third element).

As used herein, the term "module" may include a unit implemented in hardware, software, or firmware, and may interchangeably be used with other terms, for example, logic, logic block, part, or circuitry. The module may be a single integral component, or a minimum unit or part thereof, adapted to perform one or more functions. The module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a computer). The machine may invoke stored instructions from the storage medium and operate according to the invoked instructions, and may include an electronic device (e.g., the electronic device) according to the disclosed embodiments. When the instructions are executed by a processor (for example, the processor), the processor may perform functions corresponding to the instructions. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY STORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, a storage medium may have stored therein instructions which cause, when executed by at least one circuit, the at least one circuit to perform at least one operation which includes sensing light, identifying a level of the sensed light, and outputting an alert message when the identified level of the light satisfies a preset condition.

According to various embodiments, the at least one operation may further include identifying a type of a light source that emits the light and outputting the alert message when the type of the light source satisfies another preset condition.

According to various embodiments, the at least one operation may further include determining whether a wearable device is worn and identifying the level of the sensed light when determining that the wearable device is not worn.

According to various embodiments, the outputting of the alert message may include transmitting the alert message to an external electronic device when the identified level of the light satisfies the preset condition.

According to various embodiments, the outputting of the alert message may include outputting a voice corresponding to the alert message when the identified level of the light satisfies the preset condition.

According to various embodiments, the outputting of the alert message may include outputting an image corresponding to the alert message when the identified level of the light satisfies the preset condition.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A wearable device comprising:
    at least one lens;
    a display;
    at least one sensor; and
    at least one processor, wherein the at least one processor is configured to:
        identify a level of light sensed through the at least one sensor; and
        control the display to display a notification indicating that the wearable device is in a situation in which the display is capable of being damaged by the light when the level of the light satisfies a preset condition.

2. The wearable device of claim 1, wherein the at least one processor is further configured to:
    identify a type of the light as being one of natural light or artificial light; and
    control the display to display the notification by using the display when the type of the light is the natural light.

3. The wearable device of claim 1, further comprising a plate,
    wherein:
        the plate comprises a first surface directed toward the display and a second surface opposing the first surface,
        the plate further comprises an opening in at least a partial region thereof and the at least one lens is aligned with the opening, and
        the at least one sensor is arranged on the second surface of the plate.

4. The wearable device of claim 1, wherein the at least one processor is further configured to:
    identify the level of the light sensed through the at least one sensor when identifying, by using the at least one sensor, that the wearable device is not worn, the level of the light including intensity of the light.

5. The wearable device of claim 1, further comprising a communication module, wherein the at least one processor is further configured to transmit the notification to an external electronic device through the communication module, when the level of the light satisfies the preset condition.

6. The wearable device of claim 1, further comprising a speaker,
    wherein the at least one processor is further configured to output audio corresponding to the notification through the speaker, when the level of the light satisfies the preset condition.

7. The wearable device of claim 1, wherein the at least one processor is configured to control the display to display to an image corresponding to the notification, when the level of the light satisfies the preset condition.

8. The wearable device of claim 1, further comprising:
    a plurality of sectors that are arranged adjacent to the at least one lens to adjust a size of an exposure region of the at least one lens; and
    a driving circuit configured to control motion of the plurality of sectors,
    wherein the at least one processor is configured to control the motion of the plurality of sectors to reduce the exposure region of the at least one lens through the driving circuit, when the level of the light satisfies the preset condition.

9. The wearable device of claim 8, wherein the at least one processor is further configured to:
    identify a type of the light as being one of natural light or artificial light; and
    control the motion of the plurality of sectors to reduce the exposure region of the at least one lens through the driving circuit, when the type of the light is the natural light.

10. The wearable device of claim 8, wherein the at least one processor is further configured to control the motion of the plurality of sectors to increase the exposure region of the at least one lens through the driving circuit, when determining that the wearable device is worn.

11. The wearable device of claim 8, wherein the at least one processor is further configured to control the display to display a notification related to the level of the light through display when the level of the light satisfies the preset condition.

12. The wearable device of claim 8, wherein the at least one processor is further configured to control the motion of the plurality of sectors to reduce the exposure region of the at least one lens through the driving circuit, when receiving a display protection mode entry command for protecting the display.

13. A non-transitory storage medium containing instructions that when executed cause at least one processor of a wearable device comprising at least one lens, a display, at least one sensor, and the at least one processor, to:
    sense light through the at least one sensor;
    identify a level of the sensed light; and
    control the display to display a notification indicating that the wearable device is in a situation in which the display is capable of being damaged by the light when the level of the light satisfies a preset condition.

14. The non-transitory storage medium of claim 13, wherein the instructions when executed further cause the at least one processor to:
    identify a type of the light being one of natural light or artificial light; and
    control the display to display the notification when the type of the light is the natural light.

15. The non-transitory storage medium of claim 13, wherein the instructions when executed further cause the at least one processor to:
    identify the level of the light sensed through the at least one sensor when identifying that the wearable device is not worn, the level of the light including intensity of the light.

16. The non-transitory storage medium of claim 13, wherein the instructions when executed further cause the at least one processor to transmit the notification to an external electronic device through a communication module of the wearable device when the level of the light satisfies the preset condition.

17. The non-transitory storage medium of claim 13, wherein the instructions when executed further cause the at least one processor to output audio corresponding to the notification through the display when the level of the light satisfies the preset condition.

18. The non-transitory storage medium of claim 13, wherein the instructions when executed further cause the at least one processor to control the display to display an image corresponding to the notification when the level of the light satisfies the preset condition.

* * * * *